United States Patent Office 3,840,579
Patented Oct. 8, 1974

3,840,579
SULFONIC ACID ESTERS
Hsing Y. Fan, Modesto, Calif., assignor to
Shell Oil Company
No Drawing. Filed May 3, 1972, Ser. No. 249,834
Int. Cl. C07c 143/06, 143/08
U.S. Cl. 260—456 R                   3 Claims

ABSTRACT OF THE DISCLOSURE

Novel aryl- and alkylsulfonic acid esters of substituted benzyl alcohols are used for the control of soil-borne nematodes.

FIELD OF THE INVENTION

This invention relates to novel esters of aryl- and alkylsulfonic acids and to their use as nematocides.

DESCRIPTION OF THE PRIOR ART

South African application 63/5,665 discloses certain derivatives of aryl- and alkylsulfonic acid esters of 2-hydroxy-3,5-dinitrobenzyl alcohols, used as insecticides, acaricides, ovicides, herbicides and fungicides. U.S. 2,474,350 discloses aryl- or alkylsulfonic acid esters of unsubstituted benzyl alcohol.

SUMMARY OF THE INVENTION

It has now been found that novel aryl- and alkylsulfonic acid esters of alpha-alkyl- and alpha-haloalkylbenzyl alcohols are nematocides.

DESCRIPTION OF THE PREFERRED EMBODIMENT

The novel compounds are derivatives of alpha-alkyl- and alpha-haloalkylbenzyl alcohols and are represented by the formula:

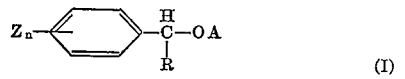
(I)

where Z is halogen, $n$ is an integer from 0 to 5, R is alkyl or alkyl substituted by halogen, and A is

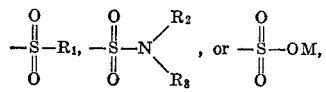

$R_1$ is alkyl or aryl, $R_2$ and $R_3$ are alkyl and M is ammonium or a mono- or di-valent metal.

More particularly, the preferred halogens are of atomic number 9-35, that is, fluorine, chlorine or bromine and preferred metals are sodium, potassium, calcium and magnesium.

Preferred nematocidally active compounds are those of the formula

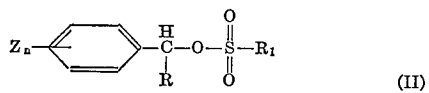
(II)

where R is alkyl of 1 to 6 carbon atoms or alkyl of 1 to 6 carbon atoms substituted by up to 5 halogen atoms, such as methyl, chloromethyl, dichloroethyl, bromoethyl, propyl, trichlorobutyl and the like; $R_1$ is alkyl of 1 to 6 carbons, such as methyl, ethyl or propyl, or aryl, such as phenyl, naphthyl and the like, or alkyl or aryl substituted by 1 to 5 halogens, and Z and $n$ are as defined above.

In the most preferred class of active compounds, Z is chlorine or bromine, $n$ is 0 to 3, R is methyl, ethyl or methyl or ethyl substituted by 1 to 3 chlorine atoms, and $R_1$ is methyl, ethyl, chloromethyl or dichloromethyl.

Typical members of this class of compounds thus include:

2,4-difluoro-α-(chloromethyl)benzyl methanesulfonate,
2,4,5-trichloro-α-propylbenzyl 2-chloroethanesulfonate,
3,4,5-trichloro-α-methylbenzyl methanesulfonate,
2-chloro-α-(chloromethyl)benzyl 4-chlorobenzenesulfonate,
2,4-dichloro-α-(fluoromethyl)benzyl 1-butanesulfonate,
2,4-dichloro-α-(chloromethyl)benzylalcohol, sodium sulfate,
3,4-dichloro-α-(2-bromoethyl)benzyl 2,3-dichloro-1-propane-sulfonate,
3,4-dichloro-α-(1-chloropentyl)benzyl 1,2-dichloroethane-sulfonate,
2,4-dichloro-α-ethylbenzyl 1-naphthalenesulfonate,
2,4-dichloro-α-(difluoromethyl)benzyl 1-butanesulfonate.

The sulfonic acid esters of the invention are readily prepared from the appropriate sulfonyl halide and an alpha-alkyl- or alpha-haloalkylbenzyl alcohol.

The novel compounds are used as nematocides. The preparation and some of the properties of the novel compounds of the invention are illustrated by the following examples. It should be understood, however, that the examples given are for the purpose of illustration only, and are not to be regarded as limiting the invention in any way. In the examples below, the structure of all the products prepared was confirmed by elemental analysis.

EXAMPLE 1

A solution of 11.4 grams of methanesulfonyl chloride in 20 milliliters benzene was added to 22.6 grams of 2,4-dichloro-alpha-(chloromethyl)benzyl alcohol, 8.05 milliliters pyridine and 120 milliliters benzene. The mixture was stirred for 2 days at 20-25° C. and for 8 hours at 40° C. The product, consisting of 4 grams of salt and 30 grams of crude oil, was recovered after filtering and solvent stripping the reaction mixture, and then recrystallized from a 50% hexane-ether mixture to give 11 grams of the 2,4-dichloro-alpha-(chloromethyl)benzyl ester of methanesulfonic acid, melting at 75°-76° C. The structure of the product was determined by infrared analysis and confirmed by elemental analysis.

EXAMPLE 2

A solution of 11.2 grams 2,4-dichloro-alpha-(chloromethyl)benzyl alcohol and 7.4 grams chloromethanesulfonyl chloride in 80 milliliters chloroform was cooled to −10° C. and maintained at this temperature during the addition of 6.6 grams diisopropylethylamine. Solvent stripping yielded 16 grams of oil which partially solidified on standing. This mixture was filtered and washed with a 9:1 mixture of pentane and methanol to yield 4.4 grams of the 2,4-dichloro-alpha-(chloromethyl)benzyl ester of chloromethanesulfonic acid, melting at 96-97° C.

Using procedures similar to those of Examples 1 and 2, the compounds of Table I were prepared.

TABLE I

Product: $Z_n-\text{C}_6\text{H}_3(R)-CH_2OA$

| Example number | R | A | $Z_n$ | Reactants | Time of reaction, hours | Temp. of reaction, °C. | Melting point, °C. | Yield, percent |
|---|---|---|---|---|---|---|---|---|
| 3 | CH₂Cl | ClCH₂SO₂ | 3,4-Cl₂ | (a) 3,4-dichloro-alpha-(chloromethyl)benzyl alcohol<br>(b) Chloromethanesulfonyl chloride | 3.5 | 20-30 | | 10 |
| 4 | CH₂Cl | CH₃SO₂ | 3,4-Cl₂ | (a) 3,4-dichloro-alpha-(chloromethyl)benzyl alcohol<br>(b) Methanesulfonyl chloride | 20 | 20-30 | 74.75 | 46 |
| 5 | CH₂Cl | CH₃SO₂ | 2,4,5-Cl₃ | (a) 2,4,5-trichloro-alpha-(chloromethyl)benzyl alcohol<br>(b) Methanesulfonyl chloride | 2 | 5-10 | 91-92 | 85 |
| 6 | CH₂CH₃ | CH₃SO₂ | 2,4-Cl₂ | (a) 2,4-dichloro-alpha-ethylbenzyl alcohol<br>(b) Methanesulfonyl chloride | 4 | 20-25 | | 97 |
| 7 | CH₂CH₃ | CH₃SO₂ | 3,4-Cl₂ | (a) 3,4-dichloro-alpha-ethylbenzyl aclohol<br>(b) Methanesulfonyl chloride | 4 | 20-25 | 47-48 | 73 |
| 8 | CH₃ | CH₃SO₂ | 2,4-Cl₂ | (a) 2,4-dichloro-alpha-methylbenzyl alcohol<br>(b) Methanesulfonyl chloride | 25 | 5-15 | | 60 |

The novel compounds of this invention have been found to be effective killers of soil-dwelling nematodes—that is, the unsegmented roundworms of the class *Nematoda*, also known as eelworms, which customarily inhabit soil and feed upon the roots of plants growing therein. The novel alkanesulfonic acid esters are particularly effective against root-knot nematodes of the genus *Meloidogyne*.

EXAMPLE 9

The compounds of the invention were thoroughly mixed with one quart soil infested with the root-knot nematode, *Meloidogyne incognita acrita*. All tests were made in duplicate. In addition, one quart jars of untreated soil served as controls. The samples of soil were held at 80° F. for two and four weeks, then were transferred to 4-inch plant pots and seeded with tomatoes. Tomatoes are excellent indicator plants for evaluation of the presence of root-knot nematodes in the soil. After two and four weeks, the soil was washed from the roots of the plants and the number of root-knot galls, as evidence of the feeding of nematodes, was visually ascertained by experienced observers. The dosages used and the control of nematodes obtained at each dosage of each of the test compounds are set out in Table II. The percent control reported is the average of the duplicate test results.

The alkanesulfonic acid esters of this invention may, if desired, be applied as such to the locus to be treated. Ordinarily and preferably, however, these compounds are used in combination with an inert diluent or carrier to make it easier to measure accurately and to apply evenly the small amounts of the nemoticide that are required to control nematode activity as well as to apply them in a form that will be readily dispersed through the soil. These compounds can be mixed with or deposited upon inert particulate solids, such as fuller's earth, talc, diatomaceous earth, natural clay, kaolin, walnut shell flour, and the like, to form dry particulate compositions. Such compositions may be employed as dusts, or they may, if desired, be dispersed in water with or without the aid of a surface-active agent. Alternatively, the dry compositions may be formed into granules or pellets by known techniques.

The alkanesulfonic acid esters may be dispensed in the form of solutions or dispersions in inert organic solvents or in mixtures of inert organic solvents and water. The solvents that may be used in the preparation of these compositions include both polar and non-polar aliphatic and aromatic solvents including, for example, benzene, toluene, xylene, naphtha, nitrobenzene, dimethylformamide, carbon tetrachloride, acetone, methyl ethyl ketone, ethanol, propanol, butanol, dioxane, and mixtures thereof.

The concentration of the alkanesulfonic acid esters in the compositions may vary widely and depends upon a number of factors, among the most important of which are the amount of the composition to be applied per unit of area and the particular nematode pest to be controlled.

It will be apparent that many specific embodiments of the invention are possible. It is desired to claim the invention as broadly as the prior art permits with reference to the hereto appended claims.

TABLE II.—CONTROL OF ROOT-KNOT NEMATODES

Compound: $Z_n-\text{C}_6\text{H}_3(R)-CH_2OA$

| | | | 36 p.p.m. | | 9 p.p.m. | | 2 p.p.m. | | 1 p.p.m. | |
|---|---|---|---|---|---|---|---|---|---|---|
| R | A | $Z_n$ | 2 weeks | 4 weeks | 2 weeks | 4 weeks | 2 weeks | 4 weeks | 2 weeks | 4 weeks |
| CH₂Cl | CH₃SO₂ | 2,4-Cl₂ | 100 | 100 | 79 | 94 | 43 | 11 | 14 | 0 |
| CH₂Cl | ClCH₂SO₂ | 2,4-Cl₂ | 100 | 100 | 86 | 90 | 18 | 0 | 9 | 0 |
| CH₂Cl | ClCH₂SO₂ | 3,4-Cl₂ | 86 | 86 | 21 | 21 | 0 | 7 | 0 | 0 |
| CH₂Cl | CH₃SO₂ | 3,4-Cl₂ | 89 | 93 | 29 | 7 | 0 | 0 | 0 | 0 |
| CH₂Cl | CH₃SO₂ | 2,4,5-Cl₃ | 100 | 100 | 96 | 100 | 75 | 45 | 58 | 45 |
| CH₂CH₃ | CH₃SO₂ | 2,4-Cl₂ | 100 | 100 | 88 | 95 | 8 | 64 | 0 | 55 |
| CH₂CH₃ | CH₃SO₂ | 3,4-Cl₂ | 100 | 100 | 58 | 86 | 0 | 73 | 0 | 36 |
| CH₃ | CH₃SO₂ | 2,4-Cl₂ | 100 | 100 | 46 | 57 | 31 | 36 | 15 | 7 |

We claim as our invention:
1. Compounds of the formula

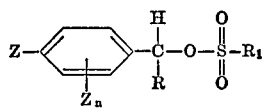

wherein Z is chlorine; $n$ is an integer of 1 or 2; R is ethyl, methyl, or chloromethyl; and $R_1$ is methyl or chloromethyl.

2. Compounds according to claim 1 wherein $R_1$ is methyl, and R is chloromethyl or ethyl.

3. The 2,4-dichloro-alpha-(chloromethyl)benzyl ester of chloromethane sulfonic acid.

References Cited
UNITED STATES PATENTS

| | | | |
|---|---|---|---|
| 2,474,350 | 6/1949 | Eilerman | 260—456 R X |
| 3,228,827 | 1/1966 | Larson et al. | 260—456 P X |

FOREIGN PATENTS

| | | | |
|---|---|---|---|
| 1,002,328 | 2/1957 | Germany | 260—456 |

OTHER REFERENCES
Chem. Abstracts 44: 8038e (1952).

BERNARD HELFIN, Primary Examiner
N. MORGENSTERN, Assistant Examiner

U.S. Cl. X.R.
260—456 A, 456 R, 457; 424—303